US008352868B2

(12) United States Patent
Betts-LaCroix et al.

(10) Patent No.: US 8,352,868 B2
(45) Date of Patent: Jan. 8, 2013

(54) COMPUTING WITH LOCAL AND REMOTE RESOURCES INCLUDING USER MODE CONTROL

(75) Inventors: Jonathan Betts-LaCroix, San Francisco, CA (US); Richard Pocklington, San Francisco, CA (US)

(73) Assignee: Google Inc., Mountain View, CA (US)

( * ) Notice: Subject to any disclaimer, the term of this patent is extended or adjusted under 35 U.S.C. 154(b) by 728 days.

(21) Appl. No.: 12/163,936

(22) Filed: Jun. 27, 2008

(65) Prior Publication Data
US 2009/0327962 A1 Dec. 31, 2009

(51) Int. Cl.
*G06F 3/00* (2006.01)
*G06F 3/048* (2006.01)

(52) U.S. Cl. ......... 715/738; 715/734; 715/735; 715/736

(58) Field of Classification Search .................. 715/732, 715/734, 735, 736, 738, 753
See application file for complete search history.

(56) References Cited

U.S. PATENT DOCUMENTS

| | | | |
|---|---|---|---|
| 6,516,350 B1 | 2/2003 | Lumelsky et al. | |
| 6,580,431 B1 * | 6/2003 | Deosaran et al. | 345/503 |
| 6,611,952 B1 * | 8/2003 | Prakash et al. | 716/102 |
| 6,721,288 B1 | 4/2004 | King et al. | |
| 6,731,314 B1 | 5/2004 | Cheng et al. | |
| 7,003,463 B1 | 2/2006 | Maes et al. | |
| 7,062,527 B1 | 6/2006 | Tyrrell, III | |
| 7,159,184 B2 * | 1/2007 | Ullah et al. | 715/762 |
| 7,290,259 B2 | 10/2007 | Tanaka | |
| 7,331,048 B2 | 2/2008 | Skovira | |
| 7,356,770 B1 * | 4/2008 | Jackson | 715/736 |
| 7,370,013 B1 | 5/2008 | Aziz et al. | |
| 7,406,522 B2 * | 7/2008 | Riddle | 709/226 |
| 7,406,691 B2 | 7/2008 | Fellenstein et al. | |
| 7,519,814 B2 * | 4/2009 | Rochette et al. | 713/167 |
| 7,599,283 B1 * | 10/2009 | Varier et al. | 370/216 |
| 7,620,706 B2 | 11/2009 | Jackson | |
| 7,653,735 B2 | 1/2010 | Mandato et al. | |
| 7,707,288 B2 | 4/2010 | Dawson et al. | |
| 7,773,530 B2 * | 8/2010 | Varier et al. | 370/241 |
| 7,779,368 B2 * | 8/2010 | Wichelman et al. | 715/833 |
| 8,051,389 B2 * | 11/2011 | Hallisey et al. | 715/853 |
| 2004/0172357 A1 * | 9/2004 | Padgette | 705/38 |
| 2005/0090911 A1 * | 4/2005 | Ingargiola et al. | 700/36 |
| 2005/0165925 A1 | 7/2005 | Dan et al. | |
| 2005/0240928 A1 | 10/2005 | Brown et al. | |
| 2007/0046282 A1 | 3/2007 | Childress et al. | |
| 2008/0134173 A1 * | 6/2008 | Abbondanzio et al. | 718/1 |
| 2009/0125910 A1 * | 5/2009 | Lazarus | 718/104 |
| 2009/0125911 A1 * | 5/2009 | Lazarus | 718/104 |
| 2009/0144741 A1 * | 6/2009 | Tsuda et al. | 718/104 |
| 2010/0049851 A1 | 2/2010 | Garrison et al. | |

* cited by examiner

*Primary Examiner* — Nicholas Augustine
(74) *Attorney, Agent, or Firm* — Morris & Kamlay LLP

(57) ABSTRACT

A method for selectively controlling allocation of one or more computing resources for a process. The method includes providing a user option to execute a process using local or remote computing resources and then executing the process using a selected option. A more specific method includes predetermining two or more allocation options; displaying a plurality of the predetermined allocation options, wherein each option indicates a different allocation of resources between at least one resource on a local computing system and at least one resource on a remote computing system, wherein the resources; determining, by using the local computing system, a function to be performed; accepting a signal from a user-input device to select one of the plurality of options in association with performing the function; allocating the resources in accordance with the selected option; and then using the selected resource allocation to accomplish a task.

17 Claims, 5 Drawing Sheets

COMPUTING WITH LOCAL AND REMOTE RESOURCES INCLUDING USER MODE CONTROL

REFERENCE TO RELATED APPLICATIONS

This application is related to the following co-pending patent applications which are each hereby incorporated by reference as if set forth in full in this specification for all purposes:

1. U.S. patent Ser. No. 12/163,936, entitled "SELECTION OF VIRTUAL COMPUTING RESOURCES USING HARDWARE MODEL REPRESENTATIONS," filed on Jun. 27, 2008; and 2. U.S. patent Ser. No. 12/163,942, entitled "COMPUTING WITH LOCAL AND REMOTE RESOURCES USING AUTOMATED OPTIMIZATION," filed on Jun. 27, 2008.

BACKGROUND

One typical approach to computing provides a user with a local computer system. The local computer system can include local computing resources such as processing power, storage capacity, bandwidth for data transfers, output capability (e.g., display, audio speakers, etc.), input capability (e.g., keyboard, mouse, touch screen, camera, gesture recognition, etc.), and other resources. The user is able to exercise a high degree of control over the local computer system and the local resources in order to perform desired functions to achieve desired results. For example, a user can use computing resources to search for and display information, run simulations; create documents, images, video, or other content; send messages, play games, or to perform many other tasks.

In some cases a user may wish to use "virtual" computing resources that are not part of a local, or otherwise dedicated computing system. Typically virtual computing resources can include any of the resources that are available in a dedicated machine, such as a local computer. The virtual computing resources are typically maintained by a different entity that is not under the user's ownership or control. For example, a company may operate dozens or hundreds of remote computers that include the ability to provide many times the amount of processing power, storage capacity, bandwidth or other resources that a user may desire. So a user may benefit from using virtual computing resources to have greater or different processing power at their disposal than they might otherwise have.

It is desirable to provide a user with controls to select among local and remote resources to perform various tasks or functions.

SUMMARY

An example embodiment allows a user to selectively control allocation of one or more remote computing resources to accomplish a task, process (or portion thereof), or other function. The method includes providing a user with allocation options to execute a function by using an arrangement of one or more local or remote computing resources; determining a user selection of an option; and then executing the function using the resources identified by the selected allocation option.

A more specific method includes providing one or more user options via a menu activated via an icon associated with the process to be executed. The one or more user options include one or more options to execute the computing process using one or more local processors or using one or more remote processors. The one or more user options further include an option to execute the process using one or more local memories or using one or more remote memories. The one or more user options further include an option to execute the process using a selected combination of remote or local processing or memory resources.

Another embodiment implements an apparatus for allocating computing resources. The apparatus includes a processor and a computer-readable storage device, which includes instructions executable by the processor for: predetermining two or more allocation options; displaying a plurality of the predetermined allocation options, wherein each option indicates a different allocation of resources between at least one resource on a local computing system and at least one resource on a remote computing system, wherein the resources are selected from (i) processing power, (ii) storage, and (iii) network bandwidth; determining, by using the local computing system, a function to be performed; accepting a signal from a user-input device to select one of the plurality of options in association with performing the function; allocating the resources in accordance with the selected option; and then using the selected resource allocation to accomplish a task.

DETAILED DESCRIPTION OF EMBODIMENTS OF THE INVENTION

For clarity, various well-known components, such as power sources, Internet Service Providers (ISPs), transceivers, firewalls, and so on, have been omitted from the figures. However, those skilled in the art with access to the present teachings will know which components to implement and how to implement them to meet the needs of a given application.

Figure 1:
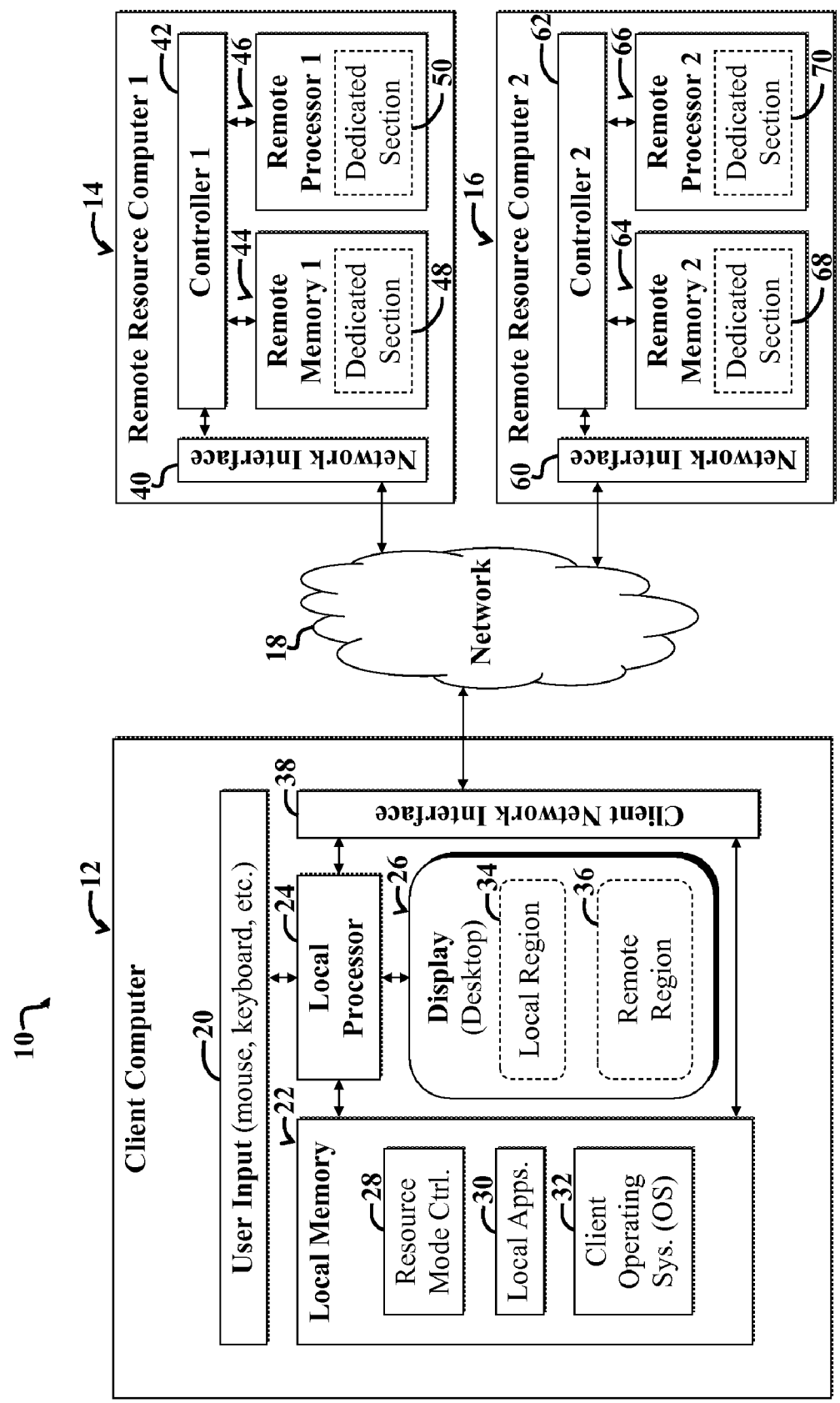
FIG. 1 shows a computing system adapted to enable a user to selectively control how local and/or remote computing resources are used to accomplish a given function or task.

FIG. 1 shows a computing system 10 adapted to enable a user to selectively control how local and/or remote computing resources are used to accomplish one or more functions or tasks.

The computing system 10 includes a client computer 12, which represents a particular user's computer. The client computer 12 is also called the local computer herein. For the purposes of the present discussion, a local computer, or local resources, may be any computer or resources dedicated to a particular user, such that the user has ownership or essentially complete control over the computer's resources. For example, the client computer 12 might represent a user's laptop computer. Since the user has control over the computer 12, the computer is considered dedicated or local. Note that a computer that is geographically remotely positioned from a user may also be considered a "local" computer with "local resources" within the meaning of the terms used herein if the resources are dedicated to the user. Example resources include memory, processing capability, network bandwidth, and so on, as discussed more fully below.

In the present specific embodiment, the client computer 12 is coupled to a first remote resource computer 14 and a second remote resource computer 16 via a network 18. The network 18 may be implemented via virtually any type of suitable computer network, such as the Internet, a Local Area Network (LAN), a wireless LAN, and so on. The exact type of network used is application specific. Although computing resources are presented as contained within a specific computer system, other embodiments can have arbitrary arrangements and organizations of resources. For example, storage devices such as hard drives, banks of RAM, optical drives, etc., can be discrete or separate devices that are individually connected to the network. Similarly, processors can be coupled to a network without being included in a larger system such as a computer system. Many such variations are possible.

The client computer 12 includes user-input devices 20, such as a mouse, keyboard, and so on. The client computer 12 further includes a local memory 22 in communication with a local processor 24. The local processor 24 communicates with the user-input devices 20, a display 26, and a client network interface 38. The client network interface 38 may include a router, firewall, or other devices used to couple the client computer 12 to the network 18. The local memory 22 includes a resource mode-control module 28, other local applications 30, and a client operating system 32. Note that the local memory 22 may store other data or applications, or certain applications may be omitted without departing from the scope of the present teachings. For example, the resource mode-control module 28 may reside on another system, such as first the remote resource computer 14. The mode-control module 28 facilitates implementing various computing modes for processes launched via the client computer 12, including a remote mode, where processing and storage of data for the processing occurs remotely; a local mode where processing and data storage occur locally; and a hybrid mode where processing and data storage selectively occur locally and remotely, as discussed more fully below.

Note that the client computer 12 may be implemented via a thin client or another more full-featured computer, such as a laptop computer, pocket PC, cellular telephone, and so on. For the purposes of the present discussion, a thin client may be any computer which is adapted to connect to a remote resource, wherein the remote resource provides a majority of the computing power and applications for running applications thereon. Note that certain thin clients may lack the operating system 32 and may instead include a module for connecting to a remote resource, such as the remote resource computer 14, which may then run an operating system suitable for use by thin client.

For illustrative purposes, the display 26 of the client computer 12 is shown including a Graphical User Interface, wherein the display 26 is separated into regions, including a local region 34 and a remote region 36. The regions 34, 36 may be used to define applications that will use local or remote resources, respectively, as discussed more fully below.

The first remote resource computer 14 of the computing system 10 may communicate with the client computer 12 via the network 18. The first remote resource computer 14 includes a first remote-resource network interface 40, which is coupled to the network 18 and a first controller 42. The first controller 42 is coupled to a first remote memory 44, which includes a first dedicated section 48. The controller 42 is further coupled to a first remote processor 46, which includes a second dedicated section 50. The second remote resource computer 16 is constructed similarly to the first remote resource computer 14. The second remote resource computer 16 includes a second remote-resource network interface 60, a second controller 62, a second remote memory 64 with a dedicated section 68, and a second remote processor 66 with a corresponding dedicated section 70.

For the purposes of the present discussion, a remote resource may be any computing feature or capability, such as memory, processing capability, bandwidth, and so on, that is positioned in a different device than the client computer 12. Remote resources are accessed by a client computer, such as the client computer 12, via a network, such as the network 18. A network may be any collection of connected or coupled devices or entities. Remote resources, as discussed herein typically reside on a computer or collection of computers owned and managed by a separate entity than the entity that owns or manages the client computer 12. However, in certain applications or embodiments, a single entity may own both the client computer 12 and resources of the remote resource computers 14, 16. Local resources may be any resources residing on the client computer 12. Note however, that in certain embodiments discussed herein, local resources may be replaced with remote dedicated resources without departing from the scope of the present teachings. For example, systems and methods discussed herein for selectively allocating local or remote resources for a particular function or process may instead be implemented as systems and methods for selectively allocating resources between different remote resources or between predetermined resources that are dedicated to or owned by a user of the client computer 12 and remote resources that are owned by a entity that is separate from the user of the client computer 12.

In operation, various software applications, such as Microsoft Word®, Adobe PhotoShop®, and so on, that are usable by a user of the client computer 12 may be represented by icons or other mechanisms via the display 26. In a particular example embodiment, certain icons may be positioned in the local region 34 or the remote region 36. The location of an icon in the display 26 affects whether the resource mode controller 28 allocates local resources of the client computer 12 and/or remote resources of the first remote resource computer 14 or the second remote resource computer 16 to implement a given process, task, or function.

The resource mode controller 28 includes instructions adapted to determine when a process represented in the local region 34 or the remote region 36 is activated by a user. The user may employ a user-input device 20 to active the process, such as by double clicking on the associated icon in the local region 34. This causes a signal to be sent to the resource mode control module 28, which may be running via the local processor 24.

Note that while the resource mode controller 28 is shown residing in local memory 22, it may be run by the processor 24. Furthermore, note that the remote mode controller 28 may be running on a remote resource, such as the first remote resource computer 14, rather than on the client computer 12.

The signal sent to the mode controller 28 includes information about the process activated by the user of the client computer 12. This information may further indicate which region 34, 36 the process was activated from. For example, if the process was activated from the local region 34, then the resource mode controller 28 automatically uses the local memory 22 and the local processor 24 to run the process, which may be a local application 30 or process thereof.

Similarly, if the process was activated from the remote region 36, a corresponding signal is sent to the resource mode controller 28. Instructions included in the resource mode controller 28 then cause the process to use one or more remote resources, such as the first remote memory 48 and the first remote processor 46.

The resource mode controller 28 may include instructions for reserving, for the process, a predetermined amount of bandwidth available via the client network interface 38, network 18, and first remote resource network interface 40 and/or the second remote network interface 60. The resource mode controller 28 may also cause a predetermined portion of remote memory 44 (e.g., first dedicated memory section 48) to be dedicated to the process launched by the client computer 12. Furthermore, the resource mode controller 28 may cause a predetermined portion of remote processing resources 46 (e.g., dedicated section 50) to be dedicated to the process launched by the client computer 12.

Before the resource mode controller 28 causes the process to be implemented via remote resources, such as the first remote memory 44 and remote processor 46, a price breakdown for using the remote resources may be provided to the user of the client computer 12 via the display 26. The user may then accept or decline to use the remote resources. If the user declines to use the remote resources, the launched process or application may be run using local resources of the client computer 12.

Hence, the resource mode-control software 28 of the client computer 12 may include instructions for providing remote resource prices to a user of the client computer 12 for use of a given amount or quality of remote resources used or to be used to perform a given process or task for a given amount of time. Note that the displaying of price information for use of remote resources may be omitted without departing from the scope of the present teachings.

Hence, a user may affect whether a given process, function, or task is implemented using local resources, such as the local memory 22 and local processor 24, or remote resources, such as the remote memories 44, 64 or remote processors 46, 66. A user may further control whether some local resources and some remote resources are used to implement a given process, as discussed more fully below.

The reserve bandwidth for a given process, the resource mode controller 28 may communicate with the network interfaces 38, 40, 60, which may include or may communicate with modules capable of receiving resource reservation instructions from the resource mode controller 28. For example, the first remote resource controller 42 may include instructions responsive to resource a resource reservation signal from the resource mode controller 28. In response to a signal from the resource mode controller 28, the first controller 42 may reserve dedicated sections or portions of resources 48, 50 for use by an associated process. Alternatively, the resource mode controller 28 selectively affects bandwidth usage by strategically scheduling processes that use bandwidth resources.

Note that the local applications 30 running on the client computer 12 may instead reside entirely in memory on a remote computer, such as the first remote resource computer 14 and or the second remote resource computer 16. Furthermore, note that the client computer 12 may use resources from a plurality of remote resource computers 14, 16.

While two remote resource computers 14, 16 are shown for illustrative purposes, additional or fewer remote resource computers may be employed without departing from the scope of the present teachings. The remote resource computers 14, 16 may be implemented as servers. For the purposes of the present discussion, a server may be computer or collection of computing resources adapted to provide one or more functions or resources to another computer, such as a client. A client may be any computer or collection of computing resources adapted to use one or more resources of a server.

Furthermore, while a single client computer 12 is shown, additional client computers may be employed without departing from the scope of the present teachings. Different client computers may reserve different dedicated sections of remote resources via their own resource mode controllers. Furthermore, a given client computer may act as both a client and a server without departing from the scope of the present teachings.

Hence, the client computer 12 may be allocated or assigned dedicated sections or portions 44, 46 of remote resources, which may be reserved or dedicated to the user of the client computer 12 for the performance of a given computing task or process. Furthermore, remote resources may be reserved for a predetermined amount of time and then released. The time for which a remote resource is reserved for use by one or more processes activated via the client computer 12 may depend on the time required to implement a given process or may be set based on some other criteria, such as whether a user has paid a fee for long term reservation of a resource.

Note that the local memory 22 and the remote memories 44, 64 may include different kinds of memory, such as hard drive space, Random Access Memory (RAM), and so on, which may be reserved for a process activated via the client computer 12 or which may be reserved for plural processes activated via the client computer 12 or for a predetermined amount of time. Similarly, the local processor 24 and the remote processors 46, 66 may include banks or processors and may include different types of processes that may be reserved via the client computer 12 and resource mode controller 28. For example, a predetermined number of processors of the first remote processing resources 46 may be reserved by or dedicated for use by the client computer 12 to complete a given computing task or for a predetermined amount of time. The time for which remote resources are used may be scheduled via the resource mode controller 28 and controllers 42, 62 of the remote resource computers 14, 16.

Hence, the computing system 10 may implement a method that includes predetermining two or more resource allocation options, such as the option to use local resources or remote resources for a given computing task. A plurality of predetermined allocation options may be displayed via the display 26. Each option may indicate a different allocation of resources (such as remote or local resource allocation) between at least one resource (local resource) on a local computing system and at least one resource (remote resource) on a remote computing system, such as one of the remote resource computers 14, 16. The resources may be selected from processing power, storage or memory, and or network bandwidth. Note that more or fewer resource selection options may be provided without departing from the scope of the present teachings.

The method further includes determining, such as via user input to the client computer 12, a function to be performed. The function to be performed may be the running of an application or a process associated with a given software application. A user may employ one or more of the user-input devices 20 to select one of a plurality of resource-allocation options in association with the function to be performed. For example, a user may drag an icon representative of a given process or function into the local region 34 or remote region 36 of the display. Upon activating of the associated icon, such as by double clicking the icon, the resource mode controller 28 allocates resources in accordance with the selected resource-allocation option. The selected resource-allocation, as indicated by the selection of the resource-allocation option, is then used to accomplish or implement the function.

Note that while in the present specific embodiment, resource-allocation options are determined by dragging an icon between a local region 34 and a remote region 36, other methods for selecting resource-allocation options may be employed. For example, certain resource-allocation menus, with various resource-allocation options selectable thereby, may be provided via the resource mode controller 28 in response to certain hot keys, mouse clicks (e.g., right clicking an icon), and so on, as discussed more fully below.

A resource allocation method implemented via the system 10 may further include displaying first and second areas on a display screen (e.g., the local region 34 and the remote region 36), wherein the first area corresponds to a first allocation of the resources, wherein the second area corresponds to a second allocation of the resources. The method further includes accepting a signal from a user-input device to move an icon from the first area into the second area and then changing an allocation of the resources from the first allocation to the second allocation. The second allocation or resources is then used to perform a task associated with the icon.

Figure 2:
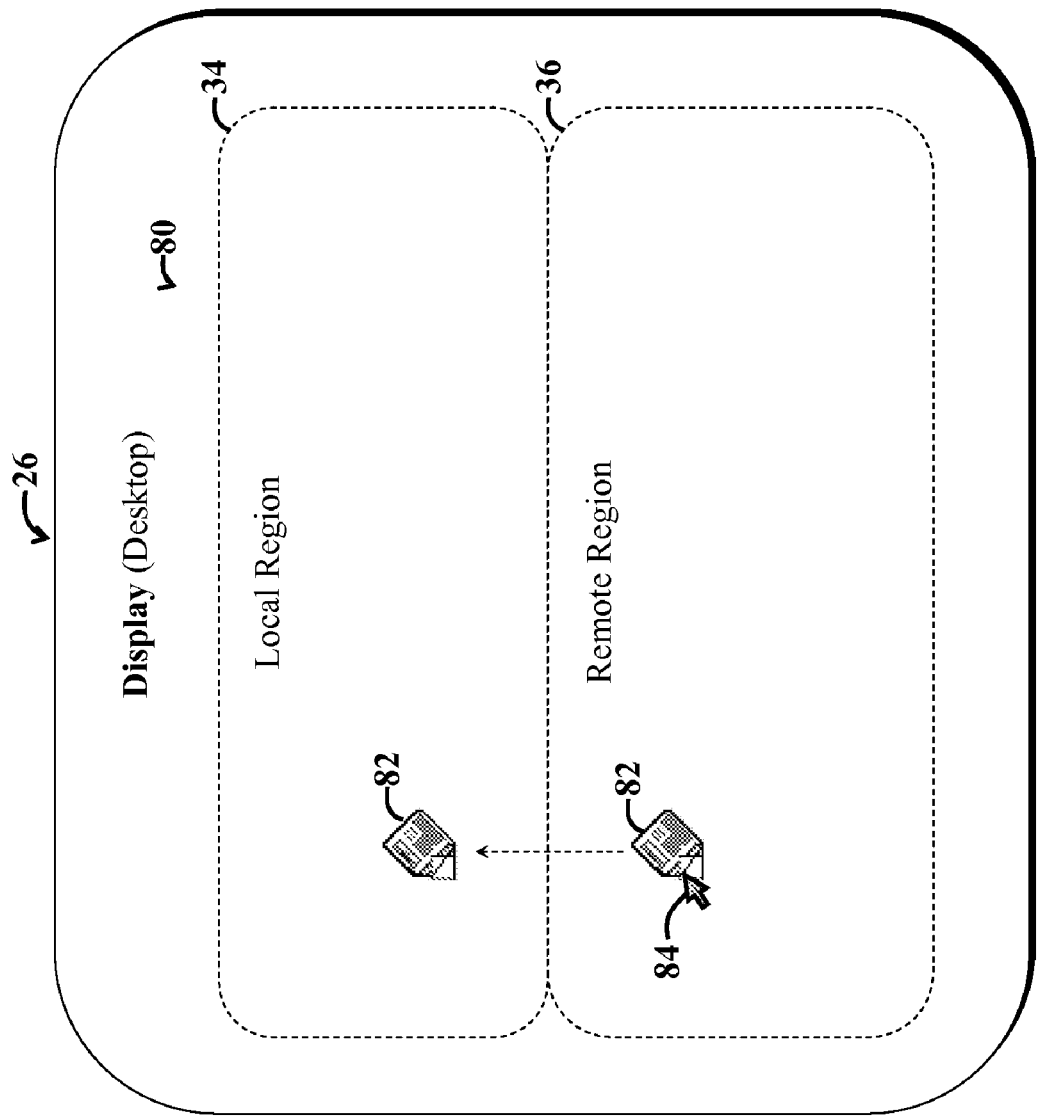
FIG. 2 shows an example display illustrating a first Graphical User Interface (GUI) with different regions for local and remote processing of files or applications represented by one or more icons.

FIG. 2 shows an example display illustrating a first Graphical User Interface (GUI) 80 with different regions 34, 36 for local and remote processing of files or applications represented by one or more icons 82. Allocation of resources to a given process or file is determined by where an icon pertaining to the process or file is positioned in the display 26.

In operation, when the process associated with icon 82 is activated while in the remote region 36, one or more remote computing resources are used to implement the process. Similarly, when a user employs a mouse 84 to drag the icon 82 to the local region 34, allocation options associated with the process referred to by the icon 82 are changed from remote resources to local resources. When the process is activated by the icon 82 when the icon is in the local region 34, one or more local resources are used to implement the process.

Figure 3:
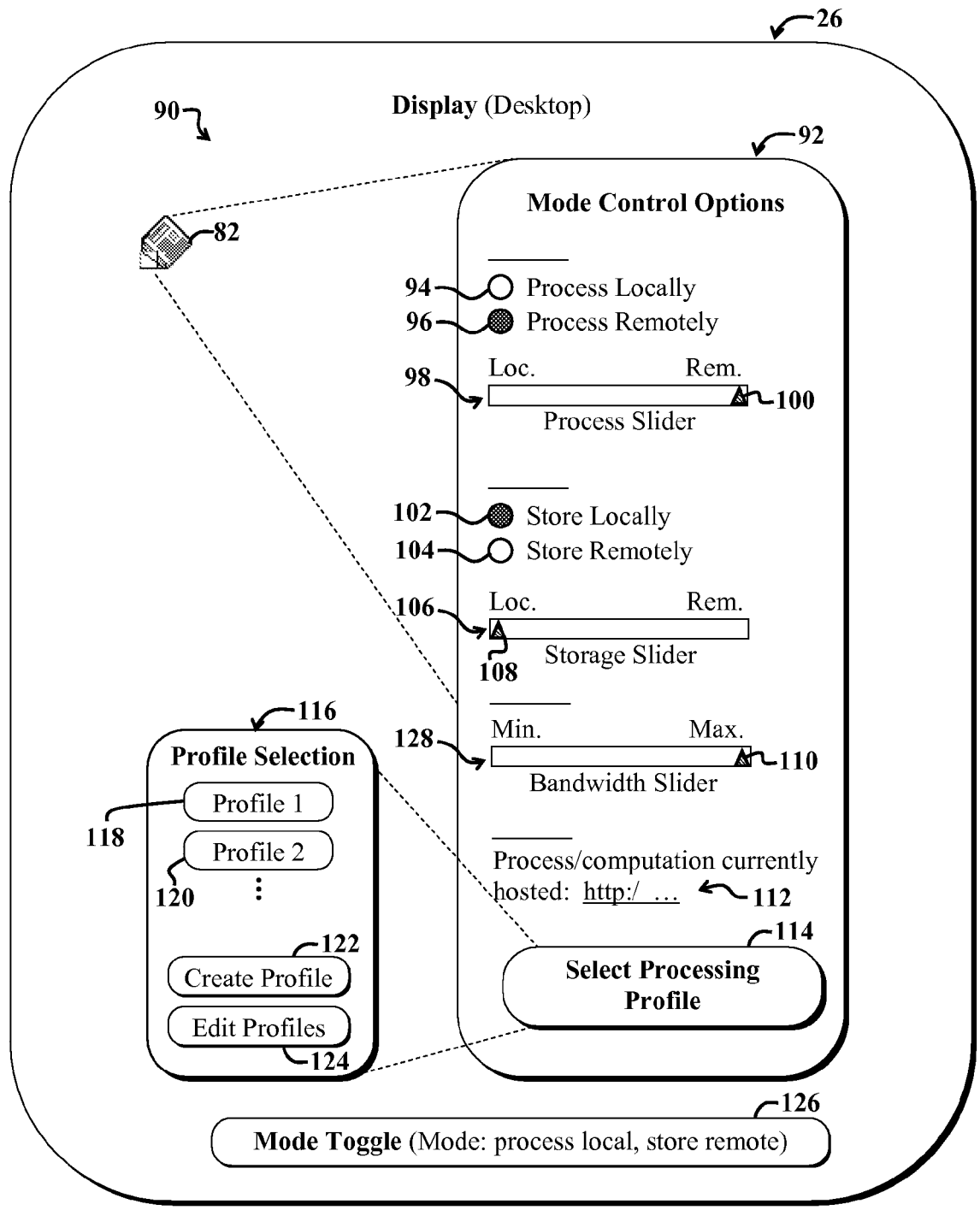
FIG. 3 shows an example display illustrating a second GUI for providing user mode-control options to affect how a given file or application uses local and/or remote resources.

FIG. 3 shows an example display 26 illustrating a second GUI 90 for providing user mode-control options to affect how a given file or application uses local and/or remote resources. In the present specific embodiment, the icon 82 is associated with a process, group of processes, function, or group of functions to be performed. A mode-control options dialog box 92 is activated, such as by right-clicking the icon 82. Functionality for implementing the mode-control options dialog box 92 may be implemented via the resource mode control module 28 running via the local processor 24 of FIG. 1.

The mode-control options dialog box 92 provides various user options for controlling how the process or processes associated with the icon 82 uses local or remote resources. For example, the mode-control options dialog box 92 includes, for illustrative purposes, a local-processing radio button 94, a remote-processing radio button 96, and a process slider 98, with a first movable tab 100. The dialog box 92 further includes a local-storage radio button 102, a remote storage radio button 104, and a storage slider 106 with a second movable tab 108. The mode-control options dialog box 92 further includes a bandwidth slider 128 with a third movable tab 110. A process/computation path 112 illustrates one or more paths where the process associated with the icon 82 is currently hosted. The process associated with the icon 82 may be hosted locally, remotely, or both remotely and locally. A processing-profile button 114 enables a user to invoke a second dialog box 116, which provides user options for setting up processing profiles, such as a first profile 118 and a second profile 120. A user may also use the second dialog box 116 to facilitate creating profiles, such as by selecting a create-profile button 122. A user may also use the second dialog box 116 to facilitate editing profiles, such as the first profile 118 or second profile 120, by selecting an edit-profile button 124.

In the present example operating scenario, a user has selected the remote-processing radio button 96. Consequently, processors used to implement the process associated with the icon 82 are remote. For example, with reference to FIGS. 1 and 3, the dedicated section 50 of the first remote processor 46 of FIG. 1 may be used to perform calculations or other functions associated with the process. If the user had selected the local-processing radio button 94, the process would be implemented via the local processor 24.

The first movable tab 100 of the process slider 98 is shown moved to the far right toward remote processing, since the remote-processing radio button 96 has been selected. If the user had selected the local-processing radio button 94, the movable tab 100 would be moved to the far left of the process slider 98. If a user selects the first movable tab 100, such as via a mouse, and slides the tab to a different position along the process slider 98, such as midway between ends of the slider 98, the radio buttons 94, 96 are deselected. In this case, a certain fraction of the computations associated with the process are performed locally, via the local processor 24, and the remainder of the calculations are performed remotely, such as via the dedicated portion 50 of the remote processor 46. For example, if the first movable tab 100 is moved to the middle of the process slider 98, both the local processor 24 and a remote processor, such as the first remote processor 46, are used approximately equally in executing the process associated with the icon 82.

In the present example operating scenario, local-storage radio button 102 is selected instead of the remote-storage radio button 104. Consequently, the second movable tab 108 associated with storage slider 106 is moved to the far left, indicating that local storage is used to implement the process associated with the icon 82. In this case, storage of parameters, data, instructions, or other information used to implement the process are stored locally, such as via the dedicated section 48 of the local memory 22. If the user had selected the remote-storage radio button 104, then the second movable tab 108 would be positioned at the far right of the storage slider 106. In addition, storage of parameters, data, instructions, or other information used to implement the process would occur remotely, such as via the dedicated section 48 of the remote memory 44.

If the user selects and moves the second movable tab 108, the storage radio buttons 102, 104 are deselected, and the storage is shared between local and remote memory resources based on the position of the second movable tab 108. For example, if the second movable tab 108 is positioned midway between ends of the storage slider 106, then both local memory 22 and remote memory 46 may be used approximately equally to facilitate implementing the underlying process associated with the icon 82.

The third movable tab 110 of the bandwidth slider is shown defaulted to maximum bandwidth 110. Consequently, the maximum bandwidth available for a process is allocated to the process associated with icon 82. If the third movable tab had been positioned at a different location along the bandwidth slider, then less bandwidth would be allocated for use by the process. For example, if the third movable tab 110 had been moved to the far left, then a predetermined minimum amount of bandwidth resources available via the network interfaces 38, 40, 60 would be usable by the process.

Various options set by the mode-control options dialog box 92 may be predetermined and stored in profiles, which may be accessed by activating the processing profile button 114, which activates the second profile-selection dialog box 116. For example, the selected options in the mode-control options dialog box 92 might correspond to a first profile 118. Another profile, such as the second profile 120, may include different selected options. For example, the second profile 120 may be associated with options selected to use all available bandwidth and to entirely use remote processing and memory or storage resources. A user might select such options by activating the processing profile button 114 and then selecting the second profile 120. The corresponding options in the mode control options dialog box 92 will then automatically be selected in accordance with the options indicated by the second profile 120. A user may employ the create-profile button 122 or the edit profile-button 124 to create new profiles or to edit existing profiles.

Note that various controls and options provided via the GUI 90 may be omitted, or additional or different controls may be used without departing from the scope of the present teachings. For example, the sliders 98, 106, 128 may be used instead of the radio buttons 94, 96, 102, 104, which may be omitted. Similarly, the sliders 98, 106, 128 may be omitted, and radio buttons may be used instead. Additional controls, such as controls for scheduling when a process is to be performed may be included.

The GUI 90 includes an additional mode-toggle button 126, which may be used to toggle processing defaults for all processes represented by icons via the display or otherwise activated via the client computer 12 of FIG. 1. For example, one mode may default all processes to use both local processing and local memory resources to run processes. Another mode may default all processes to use remote processing and remote resources to run processes. Another mode may causes processes to use a predetermined mix of local and remote resources. Hence, the mode-toggle button 126 may toggle between several different modes. An indication of the current mode may be displayed on or via the mode-toggle button 126 itself.

Additional user options may be provided. For example, additional menus may be accessible by right clicking the mode-toggle button 126. Such menus may be used to configure different modes for toggling. For example, the mode-toggle button 126 may be used to toggle default processes to settings determined by different mode profiles, such as the first profile 118 or the second profile 120. Furthermore, additional options that can be set. For example, a given mode may be set to expire after a predetermined time after which the system defaults to a predetermined mode. As another example, a user may set options based on file size, program size, or other parameters. For example, all file sizes over a predetermined limit may be allocated to remote storage. All programs with predetermined minimum processing requirements may be set to use remote resources. All operations that would require prohibitive amounts of bandwidth might be set to use local resources. Such options may be set via one or more menus that may be accessible by right clicking the mode-toggle button 126. Those skilled in the art with access to the present teachings may readily implement functionality described herein via one or more menus or other user-interface features, without undue experimentation.

Figure 4:
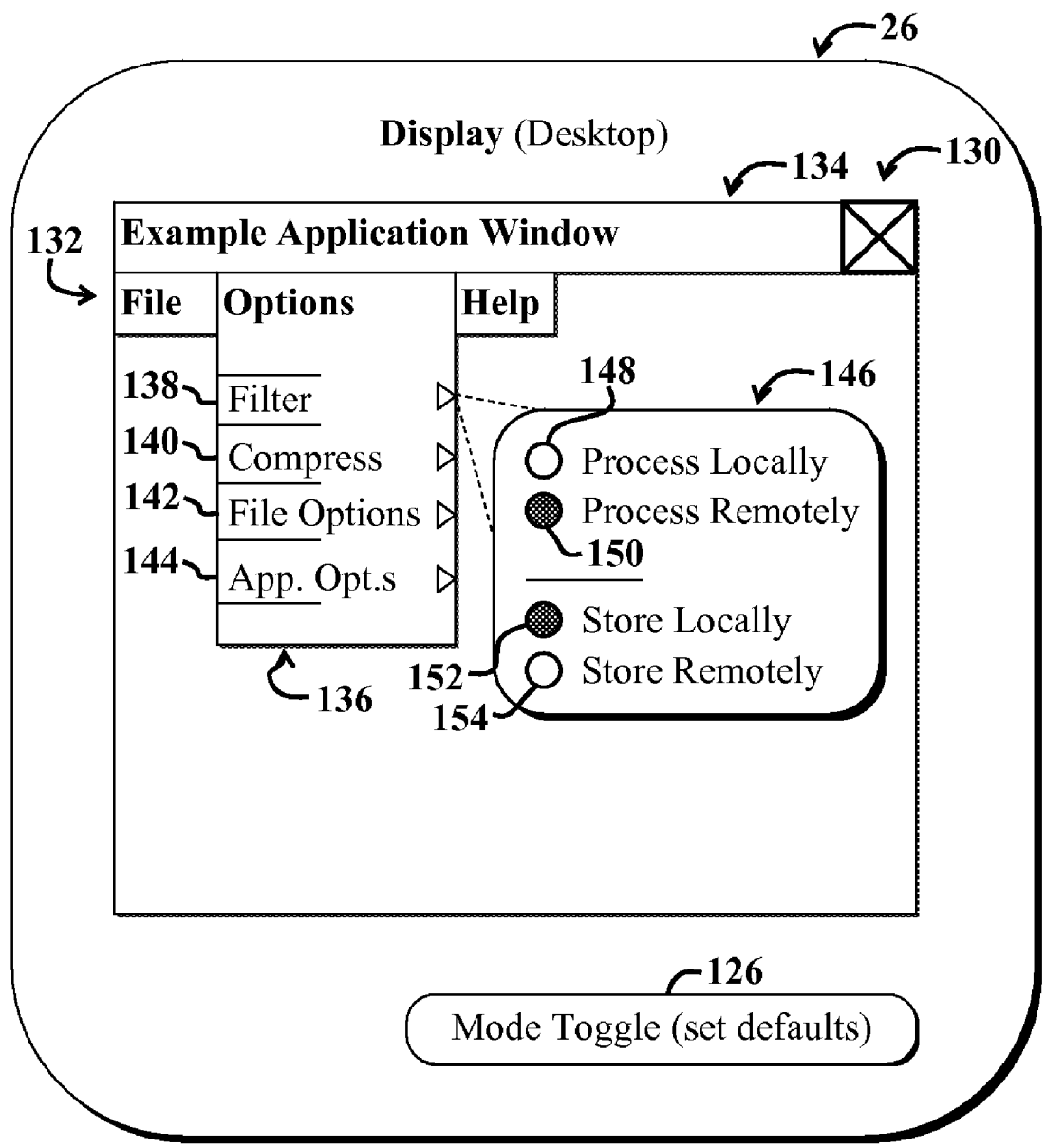
FIG. 4 shows an example display illustrating a third GUI for providing mode-control options accessible via drop down menus in an application.

FIG. 4 shows an example display 26 illustrating a third GUI 130 for providing mode-control options accessible via drop down menus 132 in an application 134. An example application represented by the application window 134 includes a menu bar 132 with drop-down menus, such as an options menu 136. Each function or process used by the application 134 may be provided with mode-control options. In the present example, the application 134 may be an image editing application, which includes, for illustrative purposes, an image filter option 138, a compression option 140, file options 142, and application options 144.

A user may set particular resource mode options for a given operation, such as filtering, by activating a tab in the drop-down menu 136 adjacent to the filter item 138. Activation of the tab causes an options-setting dialog box 146 to be displayed. The options-setting dialog box 146 includes radio buttons 148-154 to enable a user to set whether local or remote processing is used for the filter operation and whether local or remote memory is used for the filter operation. Hence, individual processes within a given application may be associated with particular options. Such additional mode-selection functionality may be built into the application 134 or may be added to the application via a plug-in or other add-on module, which may communicate with or be represented by the resource mode controller 28 of FIG. 1.

A mode-toggle button 126 is included in the GUI 130. Note that the various GUIs of FIGS. 2-3 may be implemented in a single GUI without departing from the scope of the present teachings. For example, options for selectively allocating resources for processes within an application may be provided simultaneously with options for setting parameters for the entire application, such as via the mode-control options dialog box 92 of FIG. 2, or with the regions 34, 36 of FIG. 2. In such a combined GUI, additional application-specific functionality may be included to prevent different options from conflicting with each other. For example, options set of sub-processes of an application may override options set for the entire application, which may override default options set for all processes. Alternatively, options set for an application may override options set for individual processes within or launched by an application.

Figure 5:
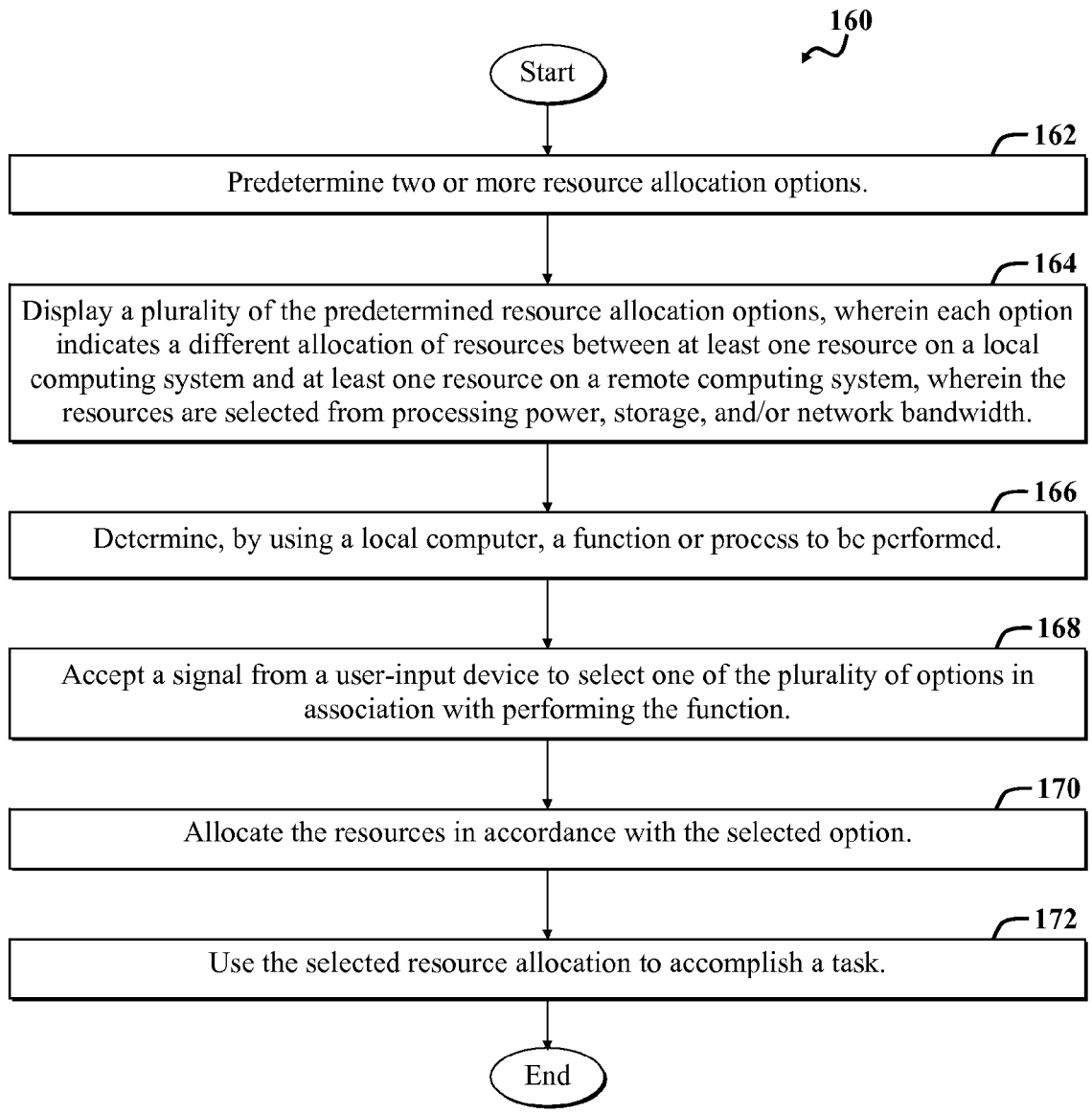
FIG. 5 shows an example method adapted for use with the system of FIG. 1 and the GUIs of FIGS. 2-4.

FIG. 5 shows an example method 160 adapted for use with the computing system 10 of FIG. 1 and the GUIs 80, 90, 130 of FIGS. 2-4. The method 160 includes a first step 162, which involves predetermining two or more computing resource allocation options.

A second step 164 includes displaying a plurality of the predetermined resource allocation options. Each resource-allocation option indicates a different allocation of resources between at least one resource on a local computing system and at least one resource on a remote computing system. The resources are selected from processing power, storage, and/or network bandwidth.

A third step 166 includes determining, via a local computer, a function or process to be performed.

A fourth step 168 includes accepting a signal from a user-input device to select one of the plurality of options in association with performing the function.

A fifth step 170 includes allocating the computing resources in accordance with the selected option.

A sixth step 172 includes using the selected computing resource allocation to accomplish a given computing task, such as performing a certain process or function.

Although specific embodiments of the invention have been described, variations of such embodiments are possible and are within the scope of the invention.

Any suitable programming language can be used to implement the functionality of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments unless otherwise specified. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. The functions may be performed in hardware, software or a combination of both.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. Functions and parts of functions described herein can be achieved by devices in different places and operating at different times. For example, a processor can perform its functions in "real time," "offline," in a "batch mode," etc. Parallel, distributed or other processing approaches can be used.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

The invention claimed is:

1. A method for allocating computing resources, the method comprising:
predetermining two or more resource allocation options;
displaying a plurality of the predetermined resource allocation options within an options dialog box, wherein each option indicates a different allocation of resources between at least one resource on a local computing system and at least one resource on a remote computing system, wherein the resources are selected from (i) processing power, (ii) storage, and (iii) network bandwidth;

accepting a signal from a user-input device to select one of the plurality of resource allocation options in association with processing at least one or more functions of a file or application from the local computing system;

displaying a first region and a second region on a display screen, wherein the first region corresponds to a first allocation of the resources on the local computing system, wherein the second region corresponds to a second allocation of the resources on the remote computing system;

displaying at least one icon; wherein the icon is a representation of the file or application;

determining, by using the local computing system, the file or application to be processed by accepting a signal from a user-input device to drag and drop the icon from the first region into the second region;

changing an allocation of the resources from the first allocation to the second allocation;

using the second allocation of resources to perform the function associated with the file or application represented by the icon;

accepting a signal from a user-input device to move the icon from the second region into the first region;

changing an allocation of the resources from the second allocation to the first allocation in response to moving the icon; and using the first allocation of resources to perform the function associated with the file or application represented by the icon.

2. The method of claim 1, further comprising:

displaying a slider control on a display screen;

accepting a signal from a user-input device to move the slider control to allocate a resource to a computing task; and executing the computing task by using the allocated resource.

3. The method of claim 1 further including enabling a user to establish a profile for a particular process or file, wherein the profile includes information determining allocation of remote and local resources for use by the process or for use when processing the file.

4. The method of claim 1 further including providing a user option to affect a default setting for a local computer, wherein the default setting specifies whether processes activated via the local computer use remote resources, local resources, or a certain combination thereof.

5. The method of claim 4 further including a mode toggle control for enabling a user to toggle certain resources used by a process between remote resources and local resources.

6. The method of claim 1 further including providing a menu, which may be displayed activated via an icon associated with a particular process or file, wherein the menu includes one or more options affecting how resources associated with the process or file are allocated among local or remote resources.

7. The method of claim 6 wherein the menu includes a storage slider control for enabling a user to set a proportion of local storage or remote storage to be used for a given process.

8. The method of claim 6 wherein the menu includes a process slider control for enabling a user to set a proportion of local processor resources and remote processor resources used to implement a given process.

9. The method of claim 6 wherein the menu includes a control for enabling a user to select a profile that specifies particular usage of local and remote storage and processing resources for a given process.

10. The method of claim 6 wherein the one or more options includes an option to enable a user to specify a duration for which a local computer uses local resources after which the local computer uses remote resources, or vice versa.

11. The method of claim 6 wherein one or more options includes an option enabling a user to specify that a process or file requiring over a predetermined amount of memory be processed with a predetermined mix of local and/or remote resources.

12. The method of claim 1 wherein a user option for selection is provided via a menu activated via an icon associated with the process.

13. The method of claim 1 wherein one or more user options are provided to execute the process using one or more local processors or using one or more remote processors.

14. The method of claim 1 wherein one or more user options are provided to execute the process using one or more local memories or using one or more remote memories.

15. The method of claim 1 wherein one or more user options are provided to execute the process using a selected combination of remote or local processing or memory resources.

16. An apparatus for allocating computing resources, the apparatus comprising:

a processor;

a computer-readable storage device including instructions executable by the processor for:

predetermining two or more resource allocation options;

displaying a plurality of the predetermined resource allocation options within an options dialog box, wherein each option indicates a different allocation of resources between at least one resource on a local computing system and at least one resource on a remote computing system, wherein the resources are selected from (i) processing power, (ii) storage, and (iii) network bandwidth;

accepting a signal from a user-input device to select one of the plurality of resource allocation options in association with processing at least one or more functions of a file or application from the local computing system;

displaying a first region and a second region on a display screen, wherein the first region corresponds to a first allocation of the resources on the local computing system, wherein the second region corresponds to a second allocation of the resources on the remote computing system;

displaying at least one icon; wherein the icon is a representation of the file or application;

determining, by using the local computing system, a function the file or application to be performed processed by accepting a signal from a user-input device to drag and drop the icon from the first region into the second region;

changing an allocation of the resources from the first allocation to the second allocation;

using the second allocation of resources to perform the function associated with the file or application represented by the icon;

accepting a signal from a user-input device to move the icon from the second region into the first region;

changing an allocation of the resources from the first area to the second area in response to moving the icon;

using the first allocation of resources in the first region to perform the function associated with the file or application represented by the icon.

17. A computer-readable storage device including one or more instructions executable by a processor for:

predetermining two or more resource allocation options;

displaying a plurality of the predetermined resource allocation options within a options dialog box, wherein each option indicates a different allocation of resources between at least one resource on a local computing system and at least one resource on a remote computing system, wherein the resources are selected from (i) processing power, (ii) storage, and (iii) network bandwidth;

accepting a signal from a user-input device to select one of the plurality of resource allocation options in association with processing at least one or more functions of a file or application from the local computing system;

displaying a first region and a second region on a display screen, wherein the first region corresponds to a first allocation of the resources on the local computing system, wherein the second region corresponds to a second allocation of the resources on the remote computing system;

displaying at least one icon; wherein the icon is a representation of the file or application;

determining, by using the local computing system, the file or application to be processed by accepting a signal from a user-input device to drag and drop the icon from the first region into the second region;

changing an allocation of the resources from the first allocation to the second allocation;

using the second allocation of resources to perform the function associated with the file or application represented by the icon;

accepting a signal from a user-input device to move the icon from the second region into the first region;

changing an allocation of the resources from the second allocation to the first allocation in response to moving the icon; and using the first allocation of resources to perform the function associated with the file or application represented by the icon.

* * * * *